US012084173B2

(12) United States Patent
Schafer (10) Patent No.: US 12,084,173 B2
(45) Date of Patent: Sep. 10, 2024

(54) ROTOR ALIGNMENT TAB

(71) Applicant: Textron Innovations, Inc., Providence, RI (US)

(72) Inventor: Steven R. Schafer, Ft. Worth, TX (US)

(73) Assignee: Textron Innovations Inc., Providence, RI (US)

( * ) Notice: Subject to any disclaimer, the term of this patent is extended or adjusted under 35 U.S.C. 154(b) by 64 days.

(21) Appl. No.: 17/968,505

(22) Filed: Oct. 18, 2022

(65) Prior Publication Data

US 2024/0124135 A1    Apr. 18, 2024

(51) Int. Cl.
*B64C 27/30* (2006.01)
*B64C 29/00* (2006.01)

(52) U.S. Cl.
CPC .......... *B64C 27/30* (2013.01); *B64C 29/0025* (2013.01); *B64C 29/0033* (2013.01)

(58) Field of Classification Search
CPC .................. B64C 27/30; B64C 27/615; B64C 2027/7261–7288; F04D 29/366; F05B 2240/305; F05B 2240/3052; F03D 1/0685; F03D 7/0232; F03D 7/0252
See application file for complete search history.

(56) References Cited

U.S. PATENT DOCUMENTS

| | | | | |
|---|---|---|---|---|
| 2,852,211 A | * | 9/1958 | Xenakis | B64C 23/02 244/203 |
| 4,715,782 A | * | 12/1987 | Shimmel | F03D 7/0252 416/169 R |
| 5,096,378 A | * | 3/1992 | Jamieson | F03D 7/0252 416/88 |
| 6,033,180 A | * | 3/2000 | Machida | B64C 27/001 244/215 |
| 8,167,554 B2 | * | 5/2012 | Wang | F03D 1/0675 416/23 |
| 9,440,737 B1 | * | 9/2016 | Cawthorne | B64C 27/615 |
| 10,144,510 B1 | * | 12/2018 | Vander Lind | B64F 3/00 |
| 11,845,532 B1 | * | 12/2023 | Long | B64C 11/002 |
| 2010/0296935 A1 | * | 11/2010 | Kamen | F03D 7/0244 416/205 |
| 2012/0070288 A1 | * | 3/2012 | Hofinger | B64C 27/72 416/131 |
| 2012/0134803 A1 | * | 5/2012 | McGrath | F03D 7/0252 416/1 |
| 2014/0255184 A1 | * | 9/2014 | Sutton | B64C 23/06 416/1 |
| 2017/0190416 A1 | * | 7/2017 | Waltner | B64C 27/72 |

* cited by examiner

*Primary Examiner* — Tien Q Dinh
*Assistant Examiner* — William L Gmoser
(74) *Attorney, Agent, or Firm* — Akona IP PC (57) ABSTRACT

One embodiment is a rotor assembly for an aircraft, the rotor assembly comprising a plurality of rotor blades, wherein at least one of the rotor blades comprises a rotor alignment drag assembly comprising a drag structure on a surface of the at least one of the rotor blades, wherein the drag structure is moveable between a first position in which the drag structure is stowed within the at least one of the rotor blades, and a second position in which the drag structure is extended from the surface of the at least one of the rotor blades; and an actuation mechanism for moving the drag structure from the first position to the second position when a speed of the rotor assembly falls below a first threshold speed.

18 Claims, 8 Drawing Sheets

ROTOR ALIGNMENT TAB

TECHNICAL FIELD

This disclosure relates in general to the field of rotorcraft and, more particularly, though not exclusively, to an alignment tab for a rotor blade of a rotor assembly for facilitating cessation of rotation and maintaining alignment of the rotor assembly.

BACKGROUND

A number of Advanced Air Mobility (AAM) rotor concepts utilize stopped rotor assemblies (or simply "rotors") to eliminate unnecessary power draw by rotors that are used only in certain flight conditions, such as Vertical Take-Off and Landing (VTOL), initial climb, and final descent. Stopping rotors, especially larger ones, can be complicated and can require the use of rotor brakes. Rotor brakes may be heavy and may take up space around the rotor mast, which may not be readily available in smaller AAM rotor systems. Additionally, maintaining the rotors in a particular (e.g., streamwise) alignment requires some form of rotor indexing, which may be mechanical or, in the case of eVTOL, electronic. Such indexing schemes can be complicated and require numerous control monitors, thereby potentially increasing the expense and weight of an aircraft.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this Specification, the terms "forward", "aft", "inboard", and "outboard" may be used to describe relative relationship(s) between components and/or spatial orientation of aspect(s) of a component or components. The term "forward" may refer to a spatial direction that is closer to a front of an aircraft relative to another component or component aspect(s). The term "aft" may refer to a spatial direction that is closer to a rear of an aircraft relative to another component or component aspect(s). The term "inboard" may refer to a location of a component that is within the fuselage of an aircraft and/or a spatial direction that is closer to or along a centerline of the aircraft (wherein the centerline runs between the front and the rear of the aircraft) or other point of reference relative to another component or component aspect. The term "outboard" may refer to a location of a component that is outside the fuselage of an aircraft and/or a spatial direction that farther from the centerline of the aircraft or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

In accordance with features of one embodiment, a passive tab installed in a rotor blade may be actuated using centripetal force (CF) and/or aerodynamic (or pressure) loading.

When actuated, the tab generates a drag or weathervaning force (depending on the embodiment) on only one side of the rotor assembly, which causes the rotor assembly to align streamwise with the rotorcraft. In particular, a combination of linear and/or torsion springs with a mass and aerodynamic load (airload) on the pressure side of a rotor blade may be leveraged to retain the alignment structure, which may be implemented as a tab or blade fin, for example, within the rotor blade (i.e., unactuated or in an unactuated position) when the rotor assembly is operating at high revolutions per minute (RPM). Tuning of the CF, airload, and spring load relative to one another enables actuation (i.e., extension) of the tab or blade fin at a select RPM or range of RPMs as the rotor slows down. Increased drag caused by the actuated tab or blade fin on the rotor facilitates deceleration of the rotor assembly. A retention backstop may be provided to retain the tab or blade fin using airload when the rotor assembly is stopped, facilitating streamwise alignment of the rotor assembly. A combination of drag load on the tab (or centering/side force on the blade fin) and motor cogging torque causes the rotor blade, and hence the rotor assembly, to remain streamwise aligned.

Figure 1A:
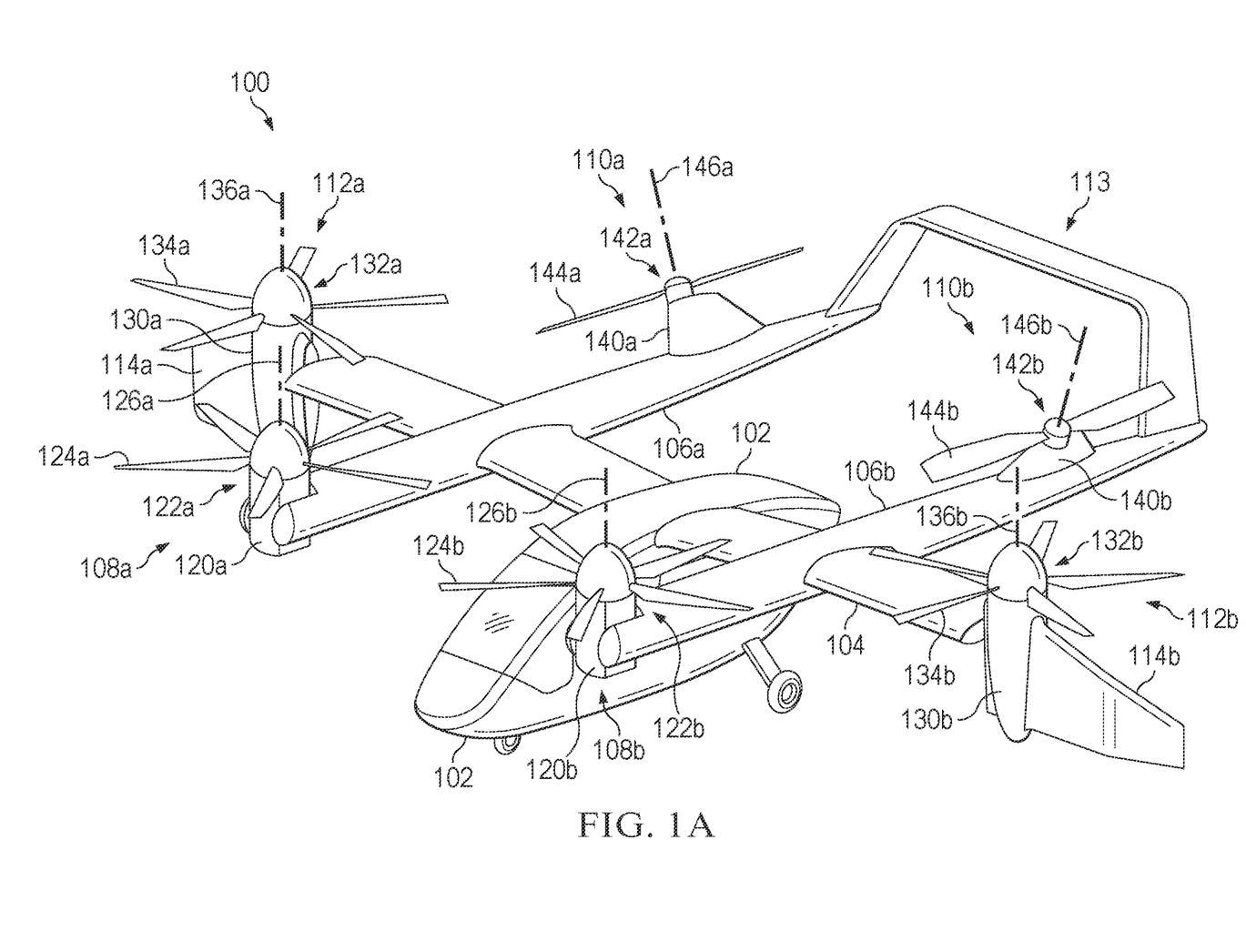
FIGS. 1A-1B illustrate a tiltrotor aircraft in accordance with embodiments described herein.
Figure 1B:
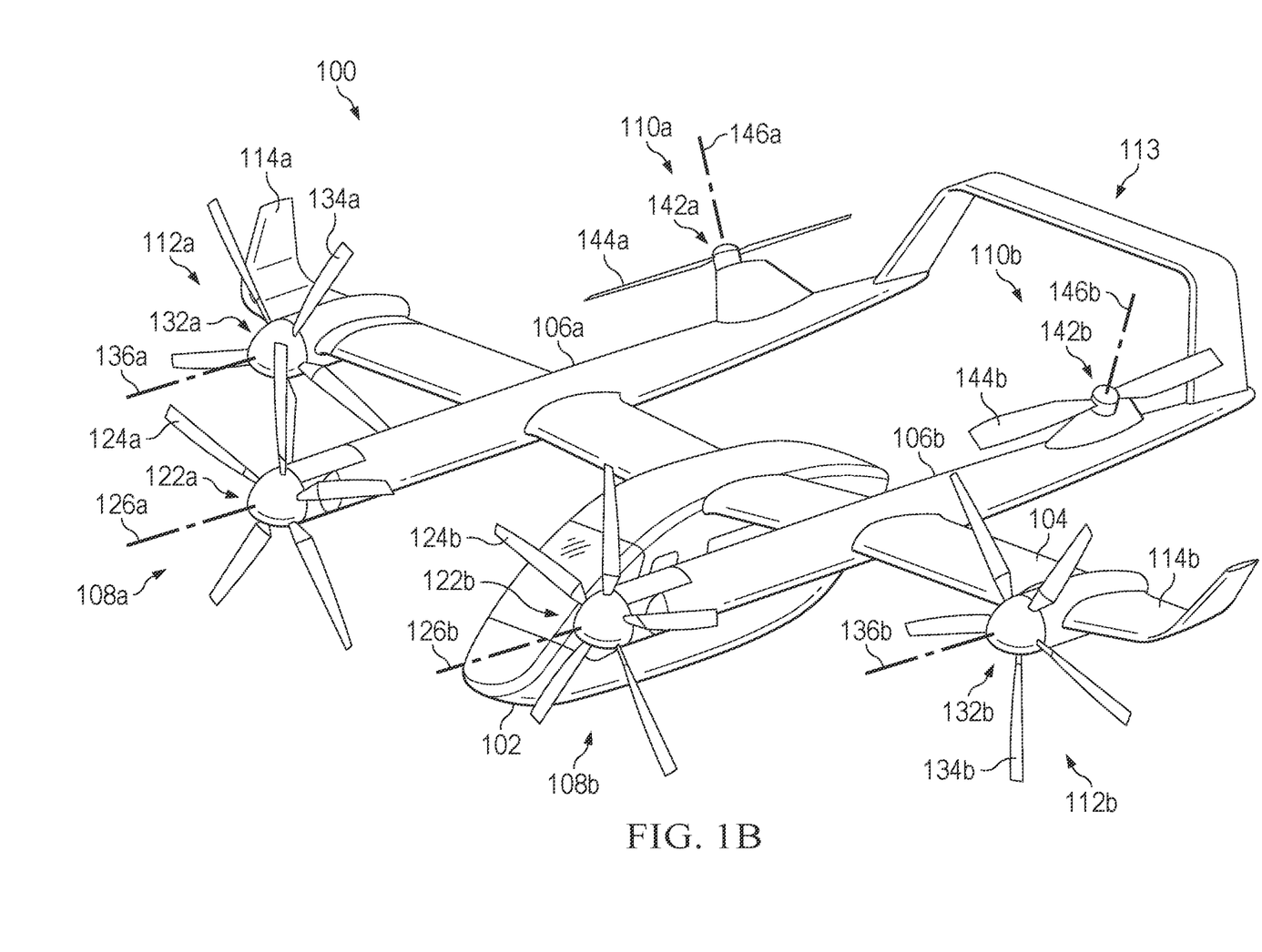

FIGS. 1A and 1B illustrate an example aircraft 100 in which a rotor alignment tab in accordance with embodiments described herein may be implemented. As illustrated in FIGS. 1A and 1B, aircraft 100 is convertible between a VTOL or hover (also commonly referred to as helicopter) mode (shown in FIG. 1A), which allows for vertical takeoff and landing, hovering, and low speed directional movement, and a cruise (also commonly referred to as airplane) mode (shown in FIG. 1B), which allows for forward flight as well as horizontal takeoff and landing. Aircraft 100 includes a fuselage 102, wing 104, and booms 106a, 106b, connected to the wing on opposite sides of the fuselage 102. In accordance with features of embodiments described herein, aircraft further includes three pairs of propulsion systems, including forward propulsion systems 108a, 108b, adjacent to the forward end of the fuselage 102, aft propulsion systems 110a, 110b, adjacent to the aft end of the fuselage 102, and a pair of wing-mounted propulsion systems 112a, 112b, proximate opposite tips of wing 104. In the illustrated embodiment, forward propulsion systems 108a, 108b, are attached to forward ends of booms 106a, 106b, respectively, and aft propulsion systems 110a, 110b, are attached to booms 106a, 106b, respectively, proximate aft ends thereof. Aircraft 100 further includes a tail assembly 113 at an aft end thereof.

In the illustrated embodiment, each forward propulsion system 108a, 108b, includes a drive system housing comprising a pylon 120a, 120b, and a rotatable open rotor assembly 122a, 122b, comprising a plurality of rotor blades 124a, 124b, connected to a rotor mast and configured to rotate about a rotor axis 126a, 126b. As shown in FIGS. 1A and 1B, each rotor assembly 122a, 122b, includes five (5) rotor blades; however, it should be recognized that more or fewer blades may be implemented without departing from the spirit and the scope of the embodiments described. Rotation of rotor blades 124a, 124b, about rotor axis 126a, 126b, generates lift while operating in helicopter mode and thrust while operating in airplane mode. Each pylon 120a, 120b, may house one or more electric motors therein configured to produce rotational energy that drives the rotation of rotor assembly 122a, 122b. Alternatively, each pylon 120a, 120b, may house a gearbox therein that drives the rotation of rotor assembly 122a, 122b, wherein the gearbox receives rotational energy from a driveshaft.

In the illustrated embodiment, each wing-mounted propulsion system 112a, 112b, includes a drive system housing comprising a pylon 130a, 130b, and a rotatable open rotor assembly 132a, 132b, comprising a plurality of rotor blades 134a, 134b, connected to a rotor mast and configured to rotate about a rotor axis 136a, 136b. As shown in FIGS. 1A and 1B, each rotor assembly 132a, 132b, includes five (5) rotor blades; however, it should be recognized that more or fewer blades may be implemented without departing from the spirit and the scope of the embodiments described. It should also be recognized that rotor assemblies 132a, 132b, may include a different number of rotor blades than rotor assemblies 122a, 122b. Rotation of rotor blades 134a, 134b, about rotor axis 136a, 136b, generates lift while operating in helicopter mode and thrust while operating in airplane mode. Each pylon 130a, 130b, may house one or more electric motors therein configured to produce rotational energy that drives the rotation of rotor assembly 132a, 132b. Alternatively, each pylon 130a, 130b, may house a gearbox therein that drives the rotation of rotor assembly 132a, 132b, wherein the gearbox receives rotational energy from a driveshaft.

In the illustrated embodiment, each aft propulsion system 110a, 110b, includes a drive system housing comprising a pylon 140a, 140b, and a rotatable open rotor assembly 142a, 142b, comprising a plurality of rotor blades 144a, 144b, connected to a rotor mast and configured to rotate about a rotor axis 146a, 146b. As shown in FIGS. 1A and 1B, each rotor assembly 142a, 142b, includes two (2) rotor blades; however, it should be recognized that more or fewer blades on a single or stacked rotor may be implemented without departing from the spirit and the scope of the embodiments described. Rotation of rotor blades 144a, 144b, about rotor axis 146a, 146b, generates lift while operating in helicopter mode. Each pylon 140a, 140b, may house one or more electric motors therein configured to produce rotational energy that drives the rotation of rotor assembly 142a, 142b. Alternatively, each pylon 140a, 140b, may house a gearbox therein that drives the rotation of rotor assembly 142a, 142b, wherein the gearbox receives rotational energy from a driveshaft. It will be recognized that while rotor assemblies 142a, 142b, are illustrated as being disposed above (i.e., on top of) booms 104a, 104b, they may alternatively be disposed below (i.e., on the underside of) booms and the distance from rotor to boom may vary or there may be rotor above and below the pylon as yet another alternative.

In the example embodiment illustrated in FIGS. 1A and 1B, wing-mounted propulsion systems 112a, 112b, are connected to inboard ends of wing tips 114a, 114b, attached to outboard ends of wing 104. Wing tips 114a, 114b, together with wing-mounted propulsion systems 112a, 112b, tilt relative to wing 104 between a first position (FIG. 1A), in which propulsion systems 112a, 112b, and wing tips 114a, 114b, are configured in a hover mode, and a second position (FIG. 1B), in which propulsion systems 112a, 112b, and wing tips 114a, 114b, are configured in a cruise mode. Similarly, forward propulsion systems 108a, 108b, (and more specifically, pylons 120a, 120b) are tiltably connected to forward ends of booms 106a, 106b, such that they may be tilted between a first position (FIG. 1A), in which propulsion systems 108a, 108b, are configured in a hover mode, and a second position (FIG. 1B), in which propulsion systems 108a, 108b, are configured in a cruise mode. In accordance with features of embodiments described herein, aft propulsion systems 110a, 110b, are fixedly attached to booms 106a, 106b, proximate aft ends thereof and do not convert between hover mode (FIG. 1A) and cruise mode (FIG. 1B).

The position of rotor assemblies 122a, 122b, 132a, 132b, as well as the pitch of individual rotor blades 124a, 124b, 134a, 134b, 144a, 144b, can be selectively controlled in order to selectively control direction, thrust, and lift of aircraft 100. As previously noted, propulsion systems 108a, 108b, 112a, 112b, are each convertible, relative to fuselage 102, between a vertical position, as shown in FIG. 1A, and a horizontal position, as shown in FIG. 1B. Propulsion systems 108a, 108b, 112a, 112b, are in the vertical position during vertical takeoff and landing mode. Vertical takeoff and landing mode may be considered to include hover operations of aircraft 100. Propulsion systems 108a, 108b, 112a, 112b, are in the horizontal position during forward flight mode, in which aircraft 100 is in forward flight. In forward flight mode, propulsion systems 108a, 108b, 112a, 112b, direct their respective thrusts in the aft direction to propel aircraft 100 forward. Aircraft 100 is operable to fly in all directions during the vertical takeoff and landing mode configuration of FIG. 1A, although faster forward flight is achievable while in the forward flight mode configuration of FIG. 1B. Propulsion systems 108a, 108b, 112a, 112b, may be tiltable between the vertical and horizontal positions by actuators (not shown) that are tiltable in response to commands originating from a pilot and/or a flight control system. Each of the propulsion systems 108a, 108b, 110a, 110b, 112a, 112b, may utilize an electric motor and gearbox unit disposed within a respective pylon 120a, 120b, 130a, 130b, 140a, 140b or a direct drive motor of group of motors on the same shaft as a power source to rotate the respective rotor assembly 122a, 122b, 132a, 132b, 142a, 142b, about rotor axis 126a, 126b, 136a, 136b, 146a, 146b, via a rotor mast.

It should be noted that, although propulsion systems 108a, 108b, are shown and described as being tiltable between cruise and hover positions, those propulsion systems may be fixed in the hover positions, similarly to propulsion systems 110a, 110b. Additionally and/or alternatively, propulsion systems 112a, 112b, may be connected to opposite ends of wing 104 such that only pylons 130a, 130b, or a portion thereof, are tiltable relative to wing 104. The tiltable pylons 130a, 130b and 108a and 108b may also be differentially tiltable and may vary in power to control yaw of the aircraft whereas different thrust for roll and pitch is controlled through differential blade pitch, rpm, and motor power.

In accordance with features of embodiments described herein, when aircraft 100 is in cruise mode, rotor assemblies 142a, 142b, may cease rotation. In embodiments in which propulsion systems 108a, 108b, are also fixed (i.e., do not convert between hover and cruise modes), rotor assemblies 122a, 122b, may also cease rotation when aircraft 100 is in cruise mode. Fewer active rotor assemblies in cruise mode improves blade loading and propulsive efficiency of the props. In addition, stopping the aft rotors avoids ingestion of the wakes from the forward rotors, which would make the aft rotors less efficient. In accordance with features described herein, one of the blades of each of the rotor assemblies 122a, 122b, 142a, 142b, may be equipped with a rotor alignment tab assembly as described in detail below for facilitating deceleration and subsequent streamwise alignment of the rotor assembly when aircraft 100 is in cruise mode and one or more of the rotor assemblies is stopped.

Figure 2A:
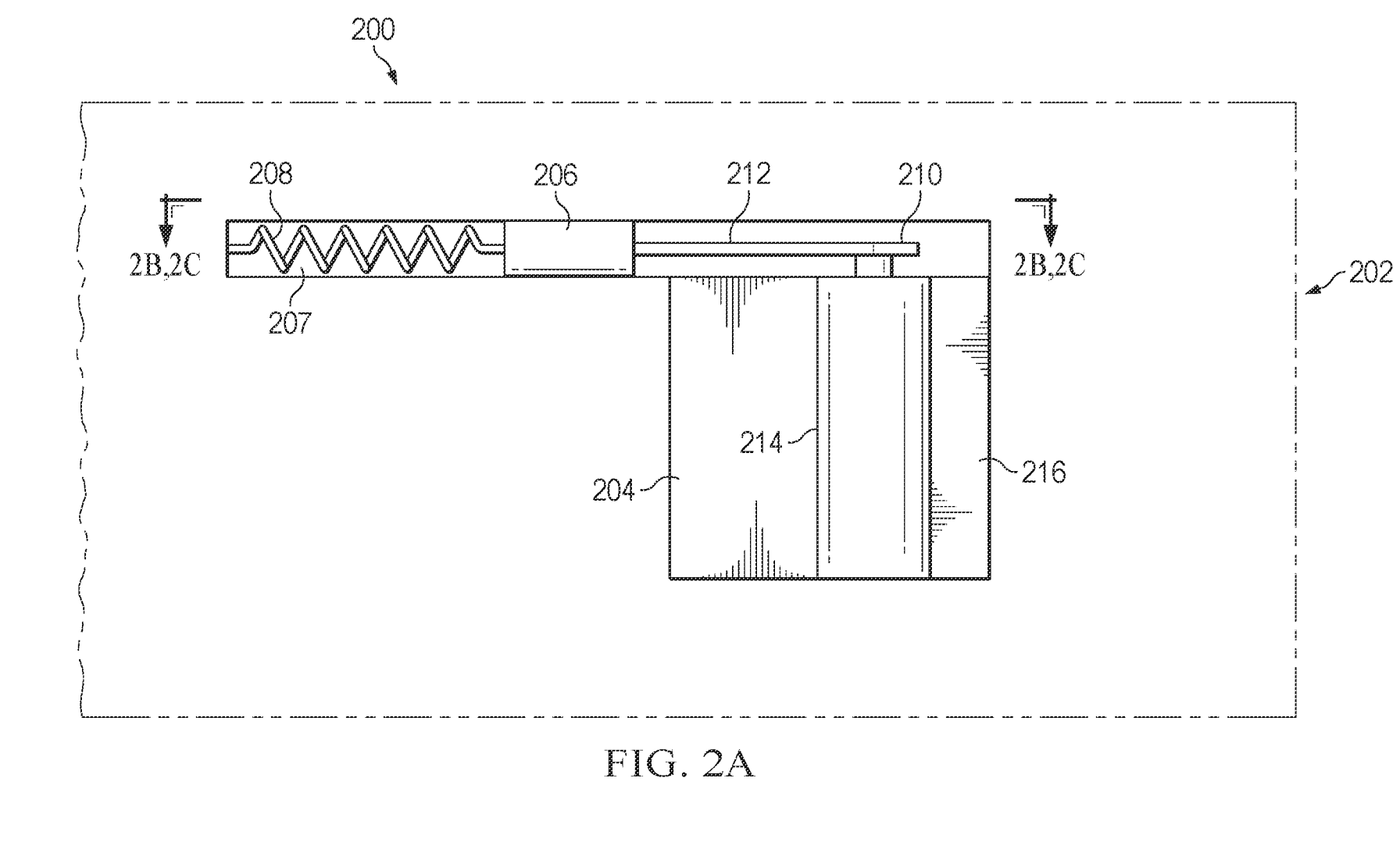
FIGS. 2A-2C illustrate an example rotor alignment tab assembly in accordance with features of embodiments described herein.
Figure 2B:
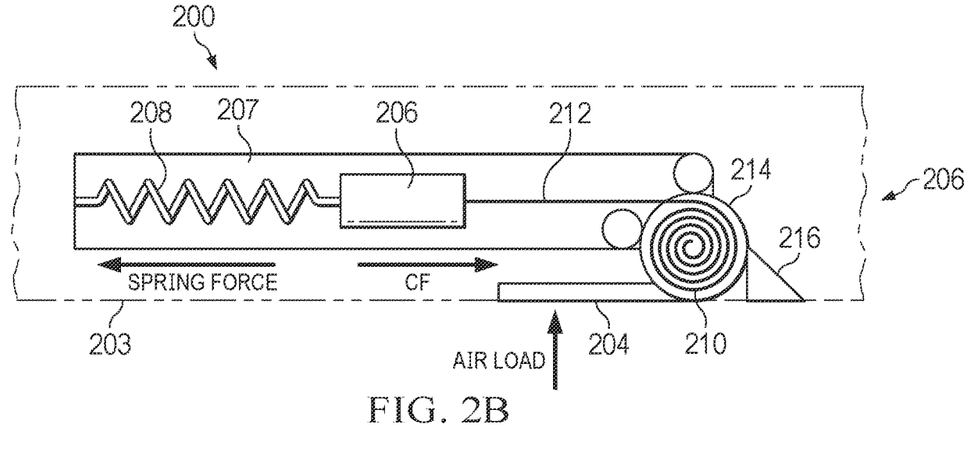
Figure 2C:
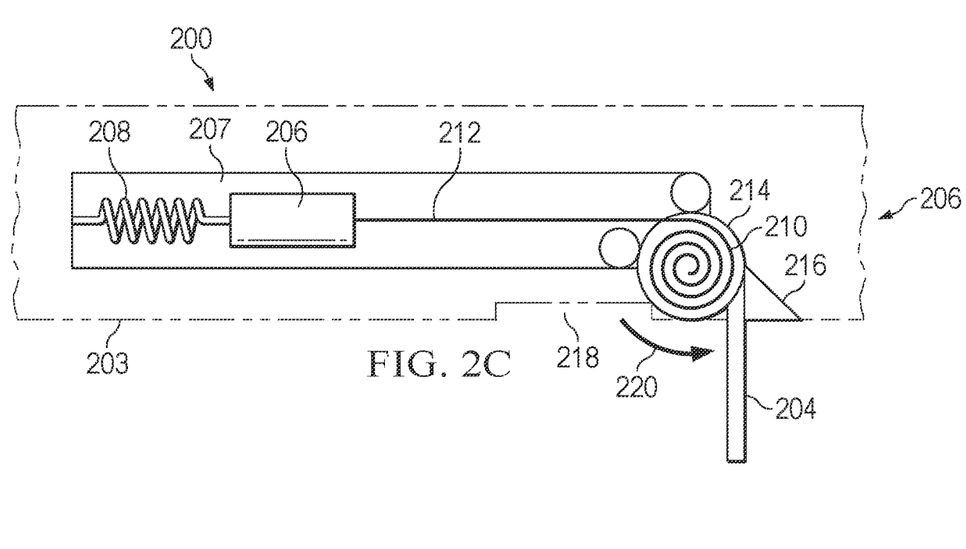

FIGS. 2A-2C illustrate an example rotor alignment tab assembly 200 for a rotor blade in accordance with features of embodiments described herein. FIG. 2A depicts a top-down spanwise view of an outboard end portion of a rotor blade 202 in which the assembly 200 is disposed. The rotor blade 202 may be used to implement one of the rotor blades of each of rotor assemblies 142a, 142b (FIG. 1A). As shown in FIG. 2A, the assembly 200 includes a tab 204 and a passive mechanism for selectively actuating, or extending, the tab 204 from a bottom surface 203 of the blade 202 including a mass 206 disposed in a channel 207 within the blade 202 extending between an outboard end of the blade and an inboard end of the blade. In particular embodiments, a weight of the mass 206 may be in the range of approximately 1-16 ounces. The channel 207 is designed such that the mass 206 may be linearly translatable between outboard and inboard ends of the channel in response to force applied to the mass in one direction or the other. In the illustrated embodiment, the inboard side of the mass 206 is connected to the inboard end of the channel 207 via a linear spring 208 that biases the mass 206 toward the inboard end of the channel 207. It will be recognized that the spring rate and spring constant of the linear spring 208 will be dependent on the weight of the mass 206 and the distance of travel within the channel 207. The outboard side of the mass 206 is connected to a torsion spring 210 via a cable (or rod) 212. The torsion spring 210 is associated with a pulley 214 and biases the tab 204 to an extended position (as shown in FIG. 2C). As will be described in greater detail below, the torsion spring 210 may be implemented as either a deployment spring or a retention spring. When implemented as a retention spring, the spring rate of the torsion spring 210 would ideally be less than the spring rate of the linear spring 208. In the illustrated embodiment, a backstop 216 is provided for purposes to be described in greater detail below.

FIGS. 2B and 2C illustrate cutaway views of the blade 202 showing the tab 204 retained within the blade (FIG. 2B) and extended from the blade (i.e., deployed) (FIG. 2C). Assuming the torsion spring 210 is implemented as a deployment spring, when the blade 202 is rotating at normal operational speed (i.e., at a high RPM (e.g., greater than approximately 800 RPM)), the CF load of the mass 206 in the blade 202 counters the load of the linear spring 208. Additionally, the air load on the bottom surface 203 of the blade 202 counters the load of the torsion spring 210 on the tab 204, such that the tab remains flush within a cutout (shown in FIG. 2C) in the bottom surface 203 of the blade 202, as shown in FIG. 2B.

Referring now also to FIG. 2C, when the rotor is turned off (i.e., when rotational force is no longer being applied to the rotor by a motor, for example), the RPM of the blade 202 will decrease to a point at which the CF load of the mass 206 cannot overcome the spring force and the springs 208 pulls on the pulley 214. At this point, the air load force on the tab 204 is now less than the combination of the torsion spring 210 and the linear spring 208 on the pulley 214 and the tab 204 deploys (i.e., rotates to an extended position out of the cutout 218 and into the flow). The backstop 216 supports and prevents over rotation and/or flapping of the tab 204 when it is extended into the flow, as shown in FIG. 2C.

It will be noted that in embodiments in which the torsion spring 210 is implemented as a deployment spring, as described above, it may be difficult to retract the tab 204 back into the cutout 218 when the rotor starts spinning again, as the air load force will be different than the initial air load force of the spinning rotor, as the tab is now deployed into the airstream and has air load on both sides. Accordingly, such embodiments (i.e., in which the torsion spring functions as a deployment spring) may be better suited for situations in which the tab needs to be deployed easily, but there is no need for the tab to be retracted when the rotors re-spin.

Referring again to FIGS. 2B and 2C, in embodiments in which the torsion spring 210 is implemented as a retention spring, when the blade 202 is rotating at normal operational speed (i.e., at a high RPM (e.g., greater than approximately 800 RPM)), the CF load of the mass 206 in the blade 202 counters the load of the linear spring 208. Additionally, the air load on the bottom surface 203 of the blade 202 and the torsion spring 210 retains the tab 204 within the cutout 218 (FIG. 2C) in the bottom surface 203 of the blade 202, as shown in FIG. 2B.

Referring now also to FIG. 2C, when the rotor is turned off (i.e., when rotational force is no longer being applied to the rotor by a motor, for example), the RPM of the blade 202 will decrease to a point at which the CF load of the mass 206 cannot overcome the spring force and the spring 208 pulls on the pulley 214. In this embodiment, the spring force must overcome both the air load and the load of the torsion spring 210 and thus will need to be stiffer (which also means that the mass 206 will need to be heavier). A stiff enough linear spring 208 will be able to overcome both the air load and the torsion spring 210, at which point, the tab 204 deploys (i.e., rotates to an extended position out of the cutout 218 and into the flow). As previously noted, the backstop 216 supports and prevents over rotation and/or flapping of the tab 204 when it is extended into the flow, as shown in FIG. 2C.

It will be noted that in embodiments in which the torsion spring 210 is implemented as a retention spring, as described above, the tab 204 may be easily retracted into the cutout once the rotors achieve peak RMP. In particular, once peak RPM is again reached, the spring load of the linear spring 208 is canceled by the CF load of the mass 206 and the pulley 214 is slack. The torsion spring 210, having no load to oppose it, will retract the tab 204 back into the cutout 218.

Extension of the tab 204 into the flow as shown in FIG. 2C will generate a chordwise drag load on the blade 202, which (in combination with the reduction in rotational force applied to the rotor assembly by the associated motor) will further slow the rotation of the rotor assembly. In certain embodiments, the tab 204 and corresponding assembly 200 are only provided on a single blade of the rotor assembly, such that the increased drag due to the extended tab 204 will cause the rotor assembly to align aft and streamwise, indexing the rotor assembly to the proper location (i.e., for rotor assembly 142a, in line with the boom 106a, as illustrated in FIG. 1A) to minimize drag of the rotor in cruise. In some embodiments, motor cogging torque will provide additional load to retain the blade 200 in a streamwise orientation. In alternative embodiments, a "dummy" assembly with a non-actuatable tab (or no tab) may be provided in the remaining rotor(s) of the rotor assembly in order to increase balance across the rotor blades of the rotor assembly. Such a dummy assembly may include all or only some portions of the assembly 200 but may advantageously include a mass similar to mass 206.

In accordance with features of embodiments described herein, the CF, airload, and spring load (via the linear spring coefficient in units of lb/in and torsion spring coefficient in units of in-lb/deg) are tuned to actuate the tab as the rotational speed of the rotor assembly slows to below a threshold RPM value or to within a range of values. The drag load caused by the extended tab causes the rotor assembly to decelerate to a stop more rapidly (e.g., as the aircraft transitions from hover to cruise mode).

In certain embodiments, the assembly 200 may be designed such that, once extended, the tab 204 remains deployed throughout the remainder of the flight and is manually reset once the aircraft is on the ground. In such cases, the rotational force applied by the motor to the rotor assembly will need to compensate for the incremental increase in drag caused by the extended tab 204.

Figure 3A:
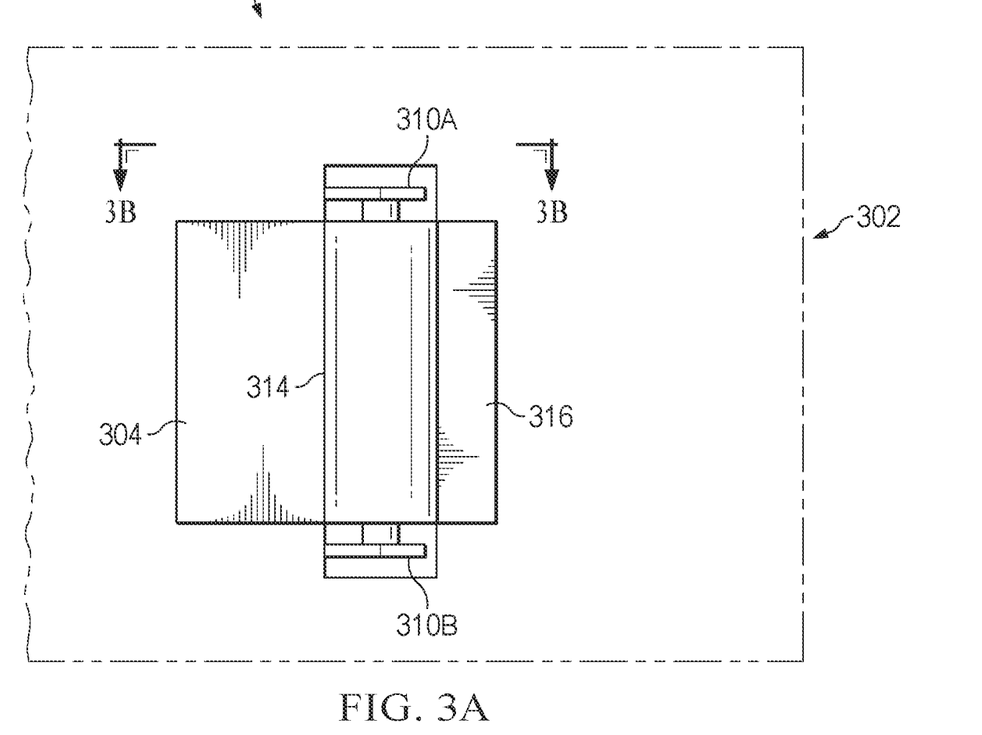
FIGS. 3A-3B illustrate another example rotor alignment tab assembly in accordance with features of embodiments described herein.
Figure 3B:
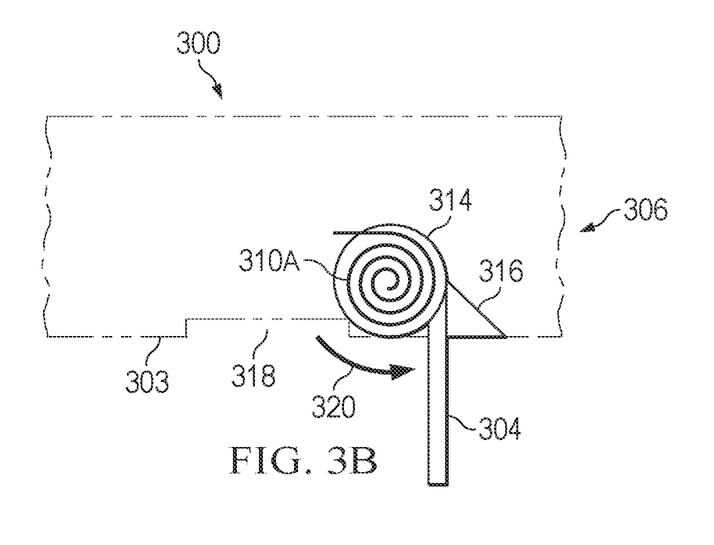

FIGS. 3A-3B illustrate an alternative example rotor alignment tab assembly 300 for a rotor blade in accordance with features of embodiments described herein. FIG. 3A depicts a top-down spanwise view of an outboard end portion of a rotor blade 302 in which the assembly 300 is disposed. The rotor blade 302 may be used to implement one of the rotor blades of each of rotor assemblies 142a, 142b (FIG. 1A). As shown in FIG. 3A, the assembly 300 includes a tab 304 and a passive mechanism for selectively actuating, or extending, the tab 304 from a bottom surface 303 of the rotor blade 302, which mechanism includes torsion springs 310A, 310B, associated with a spindle (or shaft) 314 that bias the tab 304 toward an extended position (as shown in FIG. 3B). In the illustrated embodiment, a backstop 316 is provided for purposes to be described in greater detail below.

Referring now also to FIG. 3B, which shows a cutaway view of the blade 302, when the blade 302 is rotating at normal operational speed (i.e., at a high RPM), the air load force on the tab 304 maintains the tab flush within a cutout 318 in the surface 303 of the blade 302. When the rotor assembly is turned off (i.e., when rotational force is no longer being applied to the rotor assembly by a motor, for example), the RPM of the blade 302 will decrease to a point at which air load force on the tab 304 is less than the rotational force (as represented by an arrow 320) applied to the tab by torsion springs 310A and 310B to extend the tab from the cutout 318, causing the tab 304 to rotate to an extended position out of the cutout 318 and into the flow. The backstop 316 prevents over rotation of the tab 304 when it is extended into the flow, as shown in FIG. 3B.

Extension of the tab 304 into the flow as shown in FIG. 3B will generate a chordwise drag load on the blade 302, which (in combination with the reduction in rotational force applied to the rotor assembly by the associated motor) will further slow the rotation of the rotor assembly. In accordance with features of embodiments described herein, the tab 304 and corresponding assembly 300 are only provided on a single blade of the rotor, such that the increased drag due to the extended tab 304 will cause the rotor blade to align aft and streamwise, indexing the rotor assembly to the proper location (i.e., for rotor assembly 142a, in line with the boom 106a, as illustrated in FIG. 1A). In some embodiments, motor cogging torque will provide additional load to retain the blade 300 in a streamwise orientation. In alternative embodiments, a "dummy" assembly with a non-actuatable tab (or no tab) may be provided in the remaining rotor(s) of the rotor assembly to increase balance across the rotor blades of the rotor assembly. Such a dummy assembly may include all or only some portions of the assembly 300.

In accordance with features of embodiments described herein, airload force and spring load (via the linear spring coefficient in units of lb/in and torsion spring coefficient in units of in-lb/deg) are tuned to actuate the tab as the rotational speed of the rotor assembly slows to below a threshold RPM value or to within a range of values. The drag load caused by the extended tab causes the rotor assembly to decelerate more to a stop more rapidly (e.g., as the aircraft transitions from hover to cruise mode). Similarly, as the aircraft transitions out of cruise mode (e.g., prior to descent of the aircraft), the increased rotational force applied to the rotor assembly as the rotor assembly is once again set in motion eventually results in the rotor assembly turning at an RPM that is high enough that the air load force overcomes the spring force on the tab 304 and the tab is retracted into the cutout 318.

In certain embodiments, the assembly 300 may be designed such that, once extended, the tab 304 remains extended throughout the remainder of the flight and is manually reset once the aircraft is on the ground. In such cases, the rotational force applied by the motor to the rotor assembly will need to compensate for the incremental increase in drag caused by the extended tab 304.

Figure 4A:
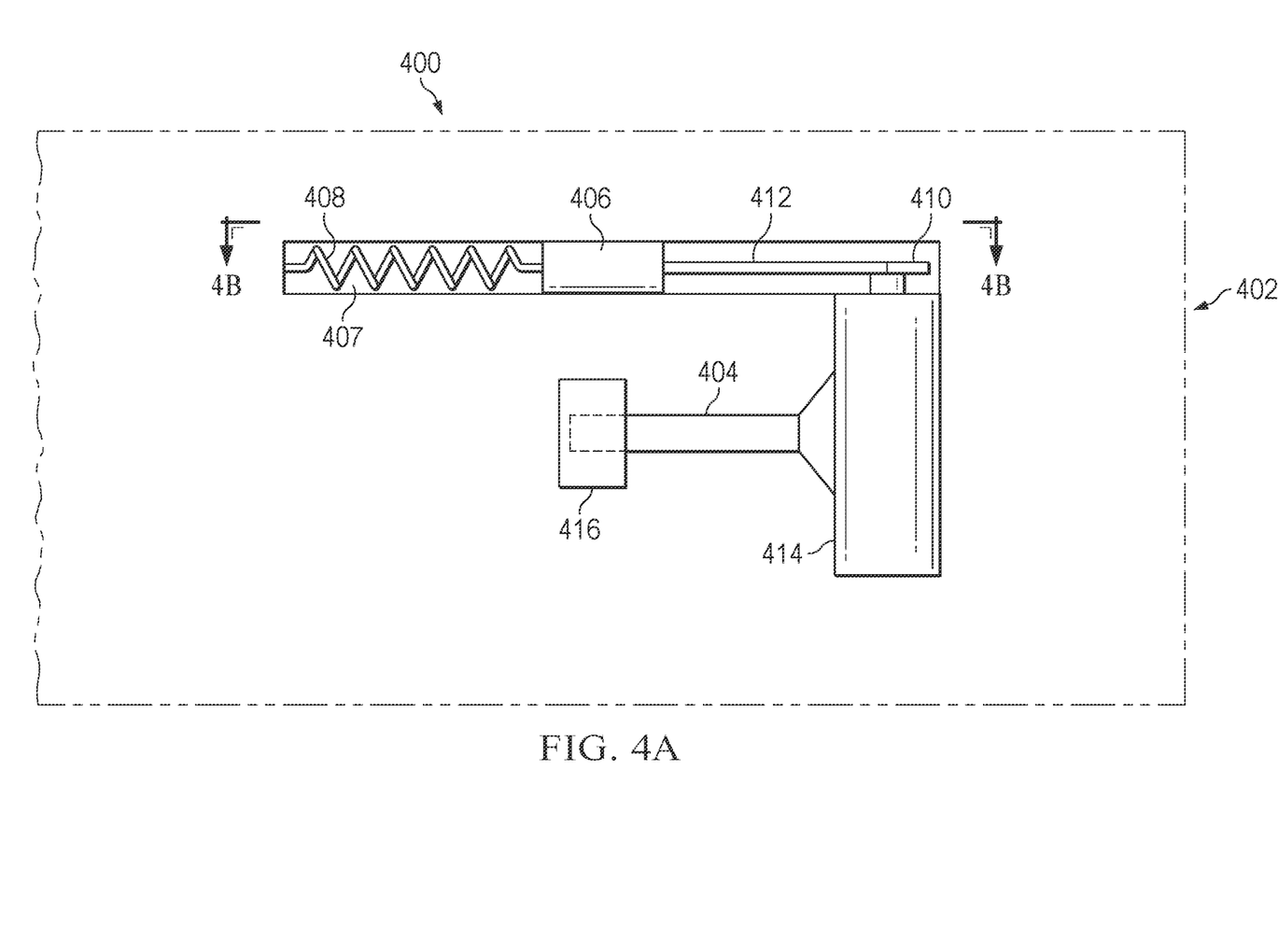
FIGS. 4A-4C illustrate yet another example rotor alignment tab assembly in accordance with features of embodiments described herein.
Figure 4B:
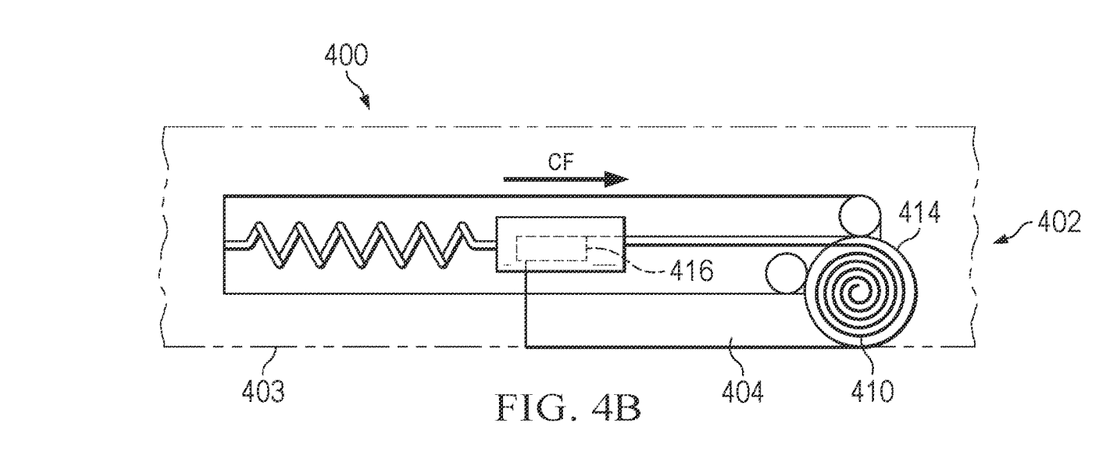
Figure 4C:
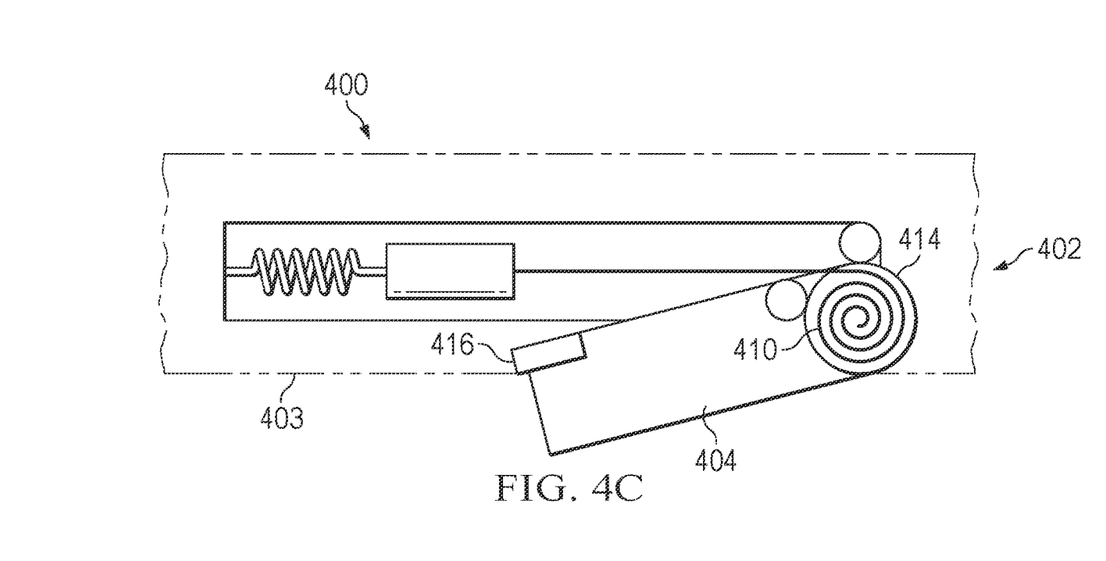

FIGS. 4A-4C illustrate another example rotor alignment tab assembly 400 for a rotor blade in accordance with features of embodiments described herein. FIG. 4A depicts a top-down spanwise view of an outboard end portion of a rotor blade 402 in which the assembly 400 is disposed. The rotor blade 402 may be used to implement one of the rotor blades of each of rotor assemblies 142a, 142b (FIG. 1A). As shown in FIG. 4A, the assembly 400 includes blade fin 404 and a passive mechanism for selectively actuating, or extending, the blade fin 404 through a bottom surface 403 of the rotor blade 402 including a mass 406 disposed in a channel 407 within the blade 402 extending between an outboard end of the blade and an inboard end of the blade. In particular embodiments, the blade fin 404 acts as a sort of weathervane and the shape of the blade fin may be a flat plate or an airfoil shape. The channel 407 is designed such that the mass 406 may be linearly translatable between outboard and inboard ends of the channel in response to force applied to the mass in one direction or the other. In the illustrated embodiment, the inboard side of the mass 406 is connected to the inboard end of the channel 407 via a linear spring 408 that biases the mass 406 toward the inboard end of the channel 407. The outboard side of the mass 406 is connected to a torsion spring 410 via a cable (or rod) 412. The torsion spring 410 is implemented as a retention spring as described above and below.

Referring now also to FIG. 4B, which shows a cutaway view of the blade 402, when the blade 402 is rotating at normal operational speed (i.e., at a high RPM (e.g., greater than approximately 800 RPM)), the CF load of the mass 406 in the blade 402 counters the load9 of the linear spring 408. Additionally, the torsion spring 410 retains the blade fin 404 within a slot (FIG. 4C) in the bottom surface 403 of the blade 402.

Referring now also to FIG. 4C, when the rotor is turned off (i.e., when rotational force is no longer being applied to the rotor by a motor, for example), the RPM of the blade 402 will decrease to a point at which the CF load of the mass 406 cannot overcome the force of the linear spring 408 and the mass begins to retract. When the CF load and torsion spring load combined are less than the linear spring force, a pulley cable of a pulley 414 is pulled taut and pulls a roller portion of the pulley, at which point, the blade fin 404 deploys (i.e., rotates to an extended position out of a slot 418 and into the flow).

A stop 416 may be affixed to the top edge of the blade fin 404 and is wider than a width of the slot 418 such that when the blade fin deploys, as shown in FIG. 4C, the stop 416 is retained within the interior of the rotor blade 402 while blade fin extends through the slot.

It will be noted that in the embodiment shown in FIGS. 4A-4C, the blade fin 404 may be easily retracted into the slot 418 once the rotor achieves peak RMP. In particular, once peak RPM is again reached, the spring load of the linear spring 408 is canceled by the CF load of the mass 406 and the pulley 414 is slack. The torsion spring 410, having no load to oppose it, will retract the blade fin 404 back into the cutout 418.

Extension of the blade fin 404 into the flow as shown in FIG. 4C will generate a chordwise drag load on the blade 402, which (in combination with the reduction in rotational force applied to the rotor assembly by the associated motor) will further slow the rotation of the rotor assembly. In certain embodiments, the blade fin 404 and corresponding assembly 400 are only provided on a single blade of the rotor assembly, such that the increased drag due to the extended blade fin 404 will cause the rotor blade to align aft and streamwise, indexing the rotor assembly to the proper location (i.e., for rotor assembly 142a, in line with the boom 106a, as illustrated in FIG. 1A). In some embodiments, motor cogging torque will provide additional load to retain the blade 400 in a streamwise orientation. In alternative embodiments, a "dummy" assembly with a non-actuatable blade fin (or no blade fin) may be provided in the remaining rotor(s) of the rotor assembly in order to increase balance across the rotor blades of the rotor assembly. Such a dummy assembly may include all or only some portions of the assembly 400, but may advantageously include a mass similar to mass 406.

In accordance with features of embodiments described herein, the CF and spring load (via the linear spring coefficient in units of lb/in and torsion spring coefficient in units of in-lb/deg) are tuned to actuate the blade fin as the rotational speed of the rotor assembly slows to below a threshold RPM value or to within a range of values. The drag load caused by the extended tab causes the rotor assembly to decelerate more to a stop more rapidly (e.g., as the aircraft transitions from hover to cruise mode). Similarly, as the aircraft transitions out of cruise mode (e.g., prior to descent of the aircraft), the increased rotational force applied to the rotor assembly as the rotor assembly is once again set in motion eventually results in the rotor assembly turning at an RPM that is high enough the CF load on the mass 406 and the torque load of torsional spring 410 overcome the spring force of spring 408 and blade fin 404 is retracted into the blade 402.

In certain embodiments, the assembly 400 may be designed such that, once extended, the blade fin 404 remains extended throughout the remainder of the flight an is manually reset once the aircraft is on the ground. In such cases, the rotational force applied by the motor to the rotor assembly will need to compensate for the incremental increase in drag caused by the extended blade fin 404.

Figure 5:
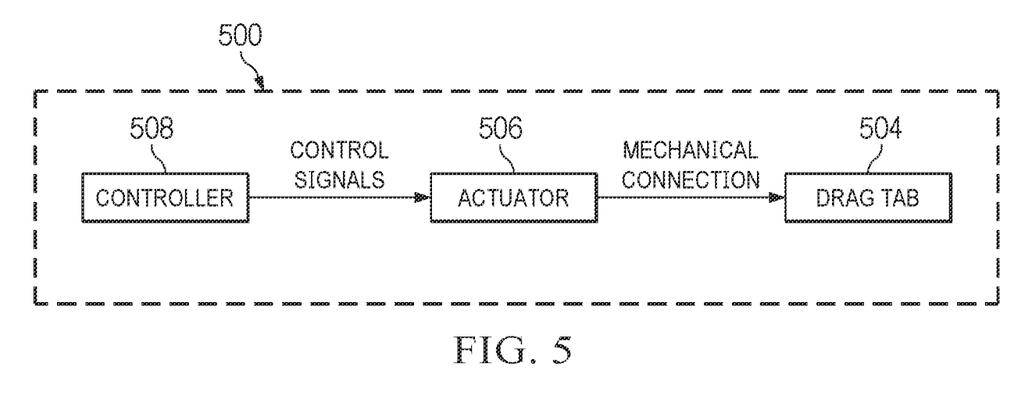
FIG. 5 illustrates a block diagram of still another example rotor alignment tab assembly in accordance with features of embodiments described herein.

One or more of the passive systems for actuating an alignment tab (or blade fin) as described above may be replaced by active actuation systems. FIG. 5 illustrates a block diagram an example rotor blade rotor alignment tab assembly 500 implemented using an active actuation system. As shown in FIG. 5, the assembly 500 may include an actuator 504 for selectively extending and retracting a drag tab 506 (which may be implemented as a tab, blade fin, or other appropriate geometry for performing the functions described hereinabove to create drag (in the case of a tab) or centering side force (in the case of a blade fin) on a rotor blade and facilitate streamwise alignment of a rotor assembly) in response to a control signal from a controller 508. In the embodiment shown in FIG. 5, the controller 508 is located within the rotor blade 502; however, in alternative embodiments, the controller 508 may be located elsewhere in the associated aircraft, such as the fuselage. The actuator 504 may comprise a linear actuator, a bell crank, and/or any other actuation mechanism that provides the functions described herein for selectively actuating a drag tab or the like on a rotor blade. It will be recognized that additional structure may be required to accommodate provide power and/or control signal transmission to the actuator 504 from other areas of the aircraft (e.g., the fuselage).

It should be appreciated that the aircraft illustrated herein, such as aircraft 100, is merely illustrative of a variety of aircraft may benefit from implementation of rotor alignment tabs as described herein. Indeed, the various embodiments of rotor alignment tabs herein may be used on any type of aircraft in which one or more rotors are stopped while the aircraft is in flight. Other aircraft implementations can include hybrid aircraft, tiltrotor aircraft, quad tiltrotor aircraft, unmanned aircraft, gyrocopters, airplanes, helicopters, commuter aircraft, electric aircraft, hybrid-electric aircraft, and the like. As such, those skilled in the art will recognize that the embodiments described herein for an electric drive system line replaceable unit can be integrated into a variety of aircraft configurations. It should be appreciated that even though aircraft are particularly well-suited to implement the embodiments of the present disclosure, non-aircraft vehicles and devices can also implement the embodiments.

The components of rotor assemblies described herein may comprise any materials suitable for use with an aircraft rotor. For example, rotor blades and other components may comprise carbon fiber, fiberglass, or aluminum; and rotor masts and other components may comprise steel or titanium.

Example 1 provides a rotor assembly for an aircraft, the rotor assembly including a plurality of rotor blades, in which at least one of the rotor blades includes a rotor alignment assembly including an alignment structure on a surface of the at least one of the rotor blades, in which the alignment structure is moveable between a first position in which the alignment structure is stowed within the at least one of the rotor blades, and a second position in which the alignment structure is extended from the surface of the at least one of the rotor blades; and an actuation mechanism for moving the alignment structure from the first position to the second position when a speed of the rotor assembly falls below a first threshold speed.

Example 2 provides the rotor assembly of example 1, in which the actuation mechanism further moves the alignment structure from the second position to the first position when the speed of the rotor assembly exceeds a second threshold speed.

Example 3 provides the rotor assembly of example 2, in which the first threshold speed is substantially equal to the second threshold speed.

Example 4 provides the rotor assembly of any of examples 1-3, in which only one of the plurality of rotor blades includes the rotor alignment assembly.

Example 5 provides the rotor assembly of any of examples 1-4, in which each of multiple ones of the plurality of rotor blades includes the rotor alignment assembly.

Example 6 provides the rotor assembly of any of examples 1-5, in which when the alignment structure is in the second position, the alignment structure generates a drag force in a spanwise direction of the at least one of the rotor blades.

Example 7 provides the rotor assembly of any of examples 1-6, in which the alignment structure includes a fin-shaped blade that generates a centering force on the at least one of the rotor blades when the fin-shaped blade is in the second position.

Example 8 provides the rotor assembly of any of examples 1-7, in which the actuation mechanism includes a passive mechanism.

Example 9 provides the rotor assembly of any of examples 1-8, in which the actuation mechanism includes an active mechanism.

Example 10 provides a rotor alignment assembly for a rotor blade, the assembly including a tab provided on a bottom surface of the rotor blade, the tab rotatable between a first position in which the tab is flush with the bottom surface of the rotor blade and a second position in which the tab extends normal to the bottom surface of the rotor blade; and a mechanism for moving the tab between the first and second positions based on a rotational speed of the rotor blade.

Example 11 provides the rotor alignment assembly of example 10, in which the mechanism for moving includes a torsion spring for biasing the tab to the second position.

Example 12 provides the rotor alignment assembly of any of examples 10-11, in which the mechanism for moving includes a torsion spring for biasing the tab to the first position and a linear spring for biasing the tab to the second position.

Example 13 provides the rotor alignment assembly of any of examples 10-12, in which the mechanism for moving includes a channel within the rotor blade, the channel having an inboard end and an outboard end; a mass enclosed within the channel and moveable within the channel between the inboard and outboard ends; a linear spring connected to the inboard end of the and an inboard side of the mass, the linear spring biasing the mass toward the inboard end of the channel; and a pulley assembly connected between an outboard side of the mass and the drag tab, in which movement of the mass toward the inboard end of the channel causes the drag tab to move toward the second position and movement of the mass toward the outboard end of the channel causes the drag tab to move toward the first position.

Example 14 provides the rotor alignment assembly of any of examples 10-13, in which the mechanism for actuating includes an actuator for moving the tab between the first and second positions; and a controller for providing a control signal to the actuator for causing the actuator to move the tab between the first and second positions.

Example 15 provides the rotor alignment assembly of example 14, in which the actuator includes at least one of a bell crank and a linear actuator.

Example 16 provides the rotor alignment assembly of any of examples 10-15, in which the mechanism for moving moves the tab toward the second position if the rotational speed of the rotor blade falls below a first threshold rotational speed and moves the tab toward the first position if the rotational speed of the rotor blade exceeds a second threshold rotational speed.

Example 17 provides the rotor alignment assembly of any of examples 10-16, in which when the tab is in the second position, drag caused by the tab results in streamwise alignment of the rotor blade.

Example 18 provides a vertical takeoff and landing aircraft (VTOL) selectively convertible between a hover mode and a cruise mode, the VTOL including a rotor assembly including a plurality of rotor blades, in which at least one of the rotor blades includes a rotor alignment assembly including an alignment structure on a surface of the at least one of the rotor blades, in which the alignment structure is moveable between a first position in which the alignment structure is stowed within the at least one of the rotor blades, and a second position in which the alignment structure is extended from the surface of the at least one of the rotor blades; and an actuation mechanism for moving the alignment structure between the first position when the VTOL is operating in the hover mode and to the second position when the aircraft is in the cruise mode, in which the rotor assembly rotates when the VTOL is operating in the hover mode and ceases to rotate when the VTOL is operating in the cruise mode.

Example 19 provides the VTOL of example 18, in which the alignment structure includes a tab, in which in the first position, the tab nests in a cutout on the surface of the at least one of the rotor blades such that a surface of the tab is flush with the surface of the at least one of the rotor blades.

Example 20 provides the VTOL of any of examples 18-19, in which the alignment structure includes a fin-shaped blade, in which the fin-shaped blade moves from the first position to the second position through a slot in the surface of the at least one of the rotor blades.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A rotor assembly for an aircraft, the rotor assembly comprising:
  a plurality of rotor blades, wherein at least one of the rotor blades comprises a rotor alignment assembly comprising:
    an alignment structure on a surface of the at least one of the rotor blades, wherein the alignment structure is moveable between a first position in which the alignment structure is stowed within the at least one of the rotor blades, and a second position in which the alignment structure is extended from the surface of the at least one of the rotor blades; and
    an actuation mechanism configured to move the alignment structure from the first position to the second position when a speed of the rotor assembly falls below a first threshold speed and to move the alignment structure from the second position to the first position when the speed of the rotor assembly exceeds a second threshold speed.

2. The rotor assembly of claim 1, wherein the first threshold speed is substantially equal to the second threshold speed.

3. The rotor assembly of claim 1, wherein only one of the plurality of rotor blades comprises the rotor alignment assembly.

4. The rotor assembly of claim 1, wherein each of multiple ones of the plurality of rotor blades comprises the rotor alignment assembly.

5. The rotor assembly of claim 1, wherein when the alignment structure is in the second position, the alignment structure generates a drag force in a spanwise direction of the at least one of the rotor blades.

6. The rotor assembly of claim 1, wherein the alignment structure comprises a fin-shaped blade that generates a centering force on the at least one of the rotor blades when the fin-shaped blade is in the second position.

7. The rotor assembly of claim 1, wherein the actuation mechanism comprises a passive mechanism.

8. The rotor assembly of claim 1, wherein the actuation mechanism comprises an active mechanism.

9. A rotor alignment assembly for a rotor blade, the assembly comprising:
a tab provided on a bottom surface of the rotor blade, the tab rotatable between a first position in which the tab is flush with the bottom surface of the rotor blade and a second position in which the tab extends normal to the bottom surface of the rotor blade; and
a mechanism for moving the tab between the first and second positions based on a rotational speed of the rotor blade;
wherein the mechanism for moving is configured to move the tab toward the second position if the rotational speed of the rotor blade falls below a first threshold rotational speed and to move the tab toward the first position if the rotational speed of the rotor blade exceeds a second threshold rotational speed.

10. The rotor alignment assembly of claim 9, wherein the mechanism for moving comprises a torsion spring for biasing the tab to the second position.

11. The rotor alignment assembly of claim 9, wherein the mechanism for moving comprises a torsion spring for biasing the tab to the first position and a linear spring for biasing the tab to the second position.

12. The rotor alignment assembly of claim 9, wherein the mechanism for moving comprises:
a channel within the rotor blade, the channel having an inboard end and an outboard end;
a mass enclosed within the channel and moveable within the channel between the inboard and outboard ends;
a linear spring connected to the inboard end of the channel and an inboard side of the mass, the linear spring biasing the mass toward the inboard end of the channel; and
a pulley assembly connected between an outboard side of the mass and the tab, wherein movement of the mass toward the inboard end of the channel causes the tab to move toward the second position and movement of the mass toward the outboard end of the channel causes the tab to move toward the first position.

13. The rotor alignment assembly of claim 9, wherein the mechanism for actuating comprises:
an actuator for moving the tab between the first and second positions; and
a controller for providing a control signal to the actuator for causing the actuator to move the tab between the first and second positions.

14. The rotor alignment assembly of claim 13, wherein the actuator comprises at least one of a bell crank and a linear actuator.

15. The rotor alignment assembly of claim 9, wherein when the tab is in the second position, drag caused by the tab results in streamwise alignment of the rotor blade.

16. A vertical takeoff and landing aircraft (VTOL) selectively convertible between a hover mode and a cruise mode, the VTOL comprising:
a rotor assembly including a plurality of rotor blades, wherein at least one of the rotor blades comprises a rotor alignment assembly comprising:
an alignment structure on a surface of the at least one of the rotor blades, wherein the alignment structure is moveable between a first position in which the alignment structure is stowed within the at least one of the rotor blades, and a second position in which the alignment structure is extended from the surface of the at least one of the rotor blades; and
an actuation mechanism for moving the alignment structure between the first position when the VTOL is operating in the hover mode and to the second position when the VTOL is in the cruise mode;
wherein the rotor assembly rotates when the VTOL is operating in the hover mode and ceases to rotate when the VTOL is operating in the cruise mode.

17. The VTOL of claim 16, wherein the alignment structure comprises a tab, wherein in the first position, the tab nests in a cutout on the surface of the at least one of the rotor blades such that a surface of the tab is flush with the surface of the at least one of the rotor blades.

18. The VTOL of claim 16, wherein the alignment structure comprises a fin-shaped blade, wherein the fin-shaped blade moves from the first position to the second position through a slot in the surface of the at least one of the rotor blades.

* * * * *